United States Patent [19]
Dekkers et al.

[11] Patent Number: 5,147,920
[45] Date of Patent: Sep. 15, 1992

[54] POLYMER MIXTURE COMPRISING POLYESTER, GLASS FIBRES, FLAME-RETARDANT AND FILLER; ARTICLES FORMED THEREFROM

[75] Inventors: Theodorus A. M. Dekkers; Wilhelmus J. L. A. Hamersma, both of Bergen op Zoom, Netherlands; Farshid Tabankia, Brasschaat, Belgium

[73] Assignee: General Electric Company, Pittsfield, Mass.

[21] Appl. No.: 514,469

[22] Filed: Apr. 25, 1990

[30] Foreign Application Priority Data

Apr. 27, 1989 [NL] Netherlands ............... 8901054

[51] Int. Cl.$^5$ ............................................. C08K 3/34
[52] U.S. Cl. ............................ 524/451; 523/351; 524/513
[58] Field of Search ............... 523/351; 524/451, 513

[56] References Cited

U.S. PATENT DOCUMENTS

| | | | |
|---|---|---|---|
| 3,624,024 | 11/1971 | Caldwell et al. | 260/40 R |
| 4,123,415 | 10/1978 | Wambach | 260/40 R |
| 4,414,352 | 11/1983 | Cohen et al. | 524/513 |
| 4,421,888 | 12/1983 | Okada | 524/371 |
| 4,460,731 | 7/1984 | Kochanowski et al. | 524/451 |
| 4,636,544 | 1/1987 | Hepp | 524/411 |
| 4,687,802 | 8/1987 | Hepp | 524/411 |
| 4,713,407 | 12/1987 | Bailey et al. | 524/451 |
| 4,983,660 | 1/1991 | Yoshida et al. | 524/451 |

FOREIGN PATENT DOCUMENTS

| | | |
|---|---|---|
| 0065777 | 12/1982 | European Pat. Off. |
| 8802218 | 7/1989 | Netherlands |
| 2000795 | 1/1979 | United Kingdom |
| 1592206 | 7/1981 | United Kingdom |

OTHER PUBLICATIONS

Hirobe, Chem. Abstracts, vol. III, Sep. 18 1989, p. 52—Flame retardant polyester compositions for injection moldings.

Ube Industries, Chem. Abstracts, vol. 101, Oct. 29, 1984, p. 42—Filled polyamides with uniform filler dispersion.

Saito, Chem. Abstracts, vol. 91, Dec. 1979, p. 37—Poly(butylene terephthalate) compositions.

Umeda, Chem. Abstracts, vol. 107, Oct. 19, 1987, p. 46—Flame-retardant polyester compositions.

*Primary Examiner*—Paul R. Michl
*Assistant Examiner*—Edward J. Cain
*Attorney, Agent, or Firm*—William F. Mufatti

[57] ABSTRACT

The invention relates to polymer mixtures which comprise a polyester, glass fibres, a brominated polystyrene and talcum. By using milled glass fibres a polymer mixture is obtained having a high tracking index, good flame-retarding properties and a great rigidity. The invention also relates to articles formed from such polymer mixtures and to a method of preparing the polymer mixtures according to the invention.

19 Claims, No Drawings

POLYMER MIXTURE COMPRISING POLYESTER, GLASS FIBRES, FLAME-RETARDANT AND FILLER; ARTICLES FORMED THEREFROM

The invention relates to a polymer mixture which comprises A. a polyester having units derived from an alkanediol and an aromatic dicarboxylic acid, B. glass fibres, C. a brominated polystyrene as a flame-retardant, and D. talcum.

The invention also relates to a method of preparing the above-mentioned polymer mixture.

The invention further relates to articles formed from the polymer mixture according to the invention.

Polymer mixtures which comprise a polyester, glass fibres, and a flame-retardant are described in the non-pre-published NL-A 8802218. It is stated that the known polymer mixtures may comprise fillers. According to this prior art, any type of glass fibre may be used as glass fibres, long and short fibres, with and without sizing. Chopped glass fibres (E-glass) are used in all the examples. The polymer mixtures according to this prior art have a good UV-resistance, a good tracking index, in combination with good flame-retarding properties and a good bending modulus.

GB-A-1592206 describes a flame retarded reinforced thermoplastic polyester composition which comprises a high molecular weight linear polyester resin, a flame-retardant i.e. a halogenated aromatic homo—or copoly—carbonate, a reinforcing agent and talc in an amount to effect an appreciable increase in the arc track resistance of the composition. As reinforcing agent one may use filamentous amenteous glass in the form of chopped strands of from $\frac{1}{8}$ to 1 inch long and a diameter of from 0.00012 to 0.00075 inch.

It has now been found that one may obtain improved properties in particular an improved tracking resistance by using a special type of glass fibres in combination with a special class of flame retardants.

The invention provides polymer mixtures having the following combination of properties: a comparative tracking index of more than 300 volts, good flame-retarding properties (V-0 according to UL 94) and a bending modulus of more than 5,000 MPa.

The polymer mixture according to the invention is characterised in that it comprises milled glass fibres as constituent B.

US-A-4,123,415 describes reinforced polyester resin based compositions, which may comprise any filler or any flame retardant. This known composition is reinforced with glass fibres having a maximum average standard diameter of about 0.0005 inches. The use of such small fibres results in a higher resistance to deflection by heat as compared to compositions in which longer fibres have been used.

The polymer mixture according to the invention preferably is such that, calculated with respect to the sum of the parts by weight of the constituents A, B, C and D, it is composed as follows:
40–50% by weight of A
15–25% by weight of B
6–16% by weight of C and
15–25% by weight of D.

Constituent A of the polymer mixture is preferably built up for more than 70 mol% of units derived from terephthalic acid and butane-1,4-diol.

In additon, the polymer mixture may comprise one or more conventionally used additives.

The invention also relates to a method of preparing the polymer mixture described hereinbefore, in which the said constituents are compounded in an extruder and in which the constituent D is used in the form of a master batch. Good results are obtained with constituent D consisting of a master batch of talcum in a styrene acrylate copolymer.

The polymer mixture according to the invention comprises at any rate one or more of the following constituents:
A: a polyester and
B: glass fibres and
C: a flame-retardant and
D: a filler.

The polymer mixture according to the invention may moreover comprise one or more of the following constituents:
E: conventionally used additives.

A. Polyester

The invention relates to polymer mixtures which comprise a polyester having units derived from an alkanediol and an aromatic dicarboxylic acid. The polyester may comprise units derived from one or more alkanediol compounds. The polyester may also comprise units derived from one or more aromatic dicarboxylic acids. In addition to the alkanediol the polyester may comprise units derived from one or more other diol compounds or polyol compounds.

In general the polyester comprises an excess of units derived from alkanediol with respect to the optionally present units derived from other diol compounds or polyol compounds. Suitable alkanediol compounds are, for example, ethanediol or butane-1,4-diol. In addition to units derived from aromatic dicarboxylic acids the polyester may also comprise units derived from other dicarboxylic acids or polycarboxylic acids. However the greater part of the units derived from acids is derived from an aromatic dicarboxylic acid. Suitable aromatic dicarboxylic acids are terephthalic acid and isophthalic acid.

A polyester having more than 70 mol% of units derived from terephthalic acid and butane-1,4-diol is preferably used. It is also possible to use a mixture of one or more polyesters, for example, a mixture of polybutylene terephthalate and polyethylene terephthalate.

B. Glass fibres

The polymer mixture according to the invention must comprise so-called milled glass fibres as glass fibres. The desired combination of properties is not obtained when the more conventional chopped glass fibres are used.

Milled glass fibres are glass fibres which have been ground to a fineness of an average diameter of 10–50 micrometres. They are so finely ground that it does not make sense to charaterize them by a "length".

C. Flame-retardant

The polymer mixture according to the invention comprises as flame-retardant a brominated polystyrene. The use of other flame-retardants results in a less favourable tracking resistance. The flameretardant may be used in combination with other compounds enhancing the flame retardancy such as for example antimony dioxide.

D. Filler

The polymer mixture according to the invention comprises talcum as a filler. The talcum is usually used in the form of a powder.

Talcum is difficult to process in extruders. It is therefore to be preferred to use the talcum in the form of a master batch. A master batch which consists of an intimate mixture of talcum and a styrene-acrylate copolymer is to be preferred.

ing to DIN 53457); the flame-retarding properties (according to UL-94); the flame-out time (FOT in seconds) and the CTI "comparative tracking index" according to IEC, 1979 (3rd edition). The results found are also recorded in the table.

| | Example | | | | | | | |
|---|---|---|---|---|---|---|---|---|
| | I | A | B | C | D | E | II | III |
| Composition (parts by weight) | | | | | | | | |
| PBT | 45.4 | 45.4 | 45.4 | 45.4 | 45.4 | 46.4 | 40.4 | 32.1 |
| Glass fibres-1 | 20 | — | 20 | 20 | 20 | 20 | 20 | 20 |
| Glass fibres-2 | — | 20 | — | — | — | — | — | — |
| FR-1 | 11 | 11 | 11 | 11 | 11 | — | 11 | 11 |
| FR-2 | — | — | — | — | — | 10 | — | — |
| Talcum-1 | 20 | 20 | — | — | — | 20 | — | — |
| Talcum-2 | — | — | — | — | — | — | 25 | — |
| Talcum-3 | — | — | — | — | — | — | — | 33.3 |
| Mica | — | — | 20 | — | — | — | — | — |
| $Sb_2O_3$ | 3.5 | 3.5 | 3.5 | 3.5 | 3 | 3.5 | 3.5 | 3.5 |
| ST | 0.15 | 0.15 | 0.15 | 0.15 | 0.15 | 0.6 | 0.15 | 0.15 |
| Clay-1 | — | — | — | 20 | — | — | — | — |
| Clay-2 | — | — | — | — | 20 | — | — | — |
| Properties | | | | | | | | |
| Bending modulus (Mpa) | 6150 | 6850 | 6020 | 4980 | 4980 | 6470 | 5534 | 6833 |
| UL-94 (1.6 mm) | VO | VO | VO | VO | V2 | VO | VO | VO |
| F.O.T (sec.) | 0 | 1 | 1 | 1 | 6-BD* | 1 | 1 | 1 |
| CTI (Volt) | 600 | 450 | 325 | 350 | 400 | 325 | 550 | 600 |

BD = Burning Drips

E. Additives

The polymer mixture according to the invention may comprise one or more conventionally used additives, for example, stabilisers, pigments, dyes, and mould-release agents.

Examples I, II and III, comparative examples A, B, C, D and E

Various polymer mixtures were prepared starting from the following constituents:

| | |
|---|---|
| PBT: | polybutylene terephthalate having an intrinsic viscosity of 0.73 ml/g measured in a phenol-tetrachloroethane 60/40 mixture at 25° C. according to ASTM D2857-70 by means of a viscosimeter according to DIN 51562. |
| Glass fibres-1: | non-coated, milled glass fibres having an average diameter of 13-15 micrometers (according to the invention). |
| Glass fibres-2: | chopped glass fibres (E-glass) having an average fibre length of 4.5 mm. |
| FR-1: | brominated polystyrene having a bromine content of 68.5% by weight. |
| FR-2: | 1,2-bis(tetrabromophthalimide)ethane, a known flame-retardant |
| Talcum-1: | talcum fibres. |
| Talcum-2: | a master batch of talcum-1 in a styrene-acrylate copolymer master batch. (60 parts by weight of talcum; 40 parts by weight of copolymer). |
| Talcum-3: | a master batch of 80 parts by weight of talcum-1 in 20 parts by weight of styrene-acrylate copolymer |
| Mica | Mica. |
| Clay-1: | a clay treated with aminosilane. |
| Clay-2: | a clay treated with epoxysilane. |
| $Sb_2O_3$: | an $Sb_2O_3$ master batch with 85% by weight of $Sb_2O_3$. |
| ST: | Stabilisers. |

The said constituents were compounded in an extruder in quantities as recorded in the table hereinafter. The resulting strands were chopped up to pellets. Standardised plates and rods were injection-moulded from the pellets to determine the bending modulus (accord- By comparing the properties of the blend according to comparative example A with those of example I, it becomes clear that the use of glass fibre —1 (milled glass) gives a significant improvement in CTI value. By comparing the results listed under "B", "C" and "D" with those listed under I one can see that the use of tacum gives a higher CTI value. When using a different flame retardant (example E) the CTI value becomes worse also (compare with example I).

From the results of the table, it is therefore clear that the combination of milled glass and brominated polystyrene gives the best CTI, while maintaining V-0 and a good bending modulus.

Example II and III demonstrate the use of a talcum master batch. In that case one also obtains a good CTI value, V-0 and a good bendingmodulus.

We claim:

1. A polymer mixture which comprises A. a polyester having units derived from an alkanediol and an aromatic dicarboxylic acid, B. glass fibres, C. a brominated polystyrene compound as a flameretardant, and D. talcum, characterised in that the polymer mixture comprises milled glass fibres as constituent B.

2. A polymer mixture as claimed in Claim 1, characterised in that, calculated with respect to the sum of the parts by weight of the constituents A, B, C and D, the polymer mixture is composed as follows:
40–50% by weight of A
15–25% by weight of B
6–16% by weight of C and
15–25% by weight of D.

3. A polymer mixture as claimed in Claim 1, characterised in that constituent A is built up for more than 70 mol% of units derived from terephthalic acid and butane-1,4-diol.

4. A polymer mixture as claimed in Claim 1, characterised in that constituent A consists of a mixture of various polyesters.

5. A polymer mixture as claimed in Claim 1, characterised in that the polymer mixture comprises in addition one or more conventionally used additives.

6. A method of preparing a polymer mixture which comprises A. a polyester having units derived from an alkanediol and an aromatic dicarboxylic acid, B. glass fibres, C. a brominated polystyrene and D. talcum, in which the said constituents are compounded in an extruder, characterised in that constituent D. is used in the form of a master batch.

7. A method as claimed in Claim 6, characterised in that constituent D. consists of a master batch of talcum in a styrene-acrylate copolymer.

8. Articles formed from the polymer mixture of claim 1.

9. Article formed from the polymer mixture of claim 2.

10. A method of improving the comparative tracking index of a mixture of polyester having units derived from an alkanediol and an aromatic dicarboxylic acid and talcum comprising adding, in combination, an effective amount of brominated polystyrene and milled glass fibers to raise the comparative tracking index of the mixture.

11. The method as claimed in claim 10, wherein the amount of brominated polystyrene and milled glass fibers, in combination, is sufficient to raise the comparative tracking index of the mixture to at least about 550.

12. The method as claimed in claim 10, wherein the amount of brominated polystyrene is about 6 to about 16 percent by weight, and the amount of milled glass fibers is about 15 to about 25 percent by weight based on the sum of the parts by weight of the polyester, the milled glass fibers, the talcum and the brominated polystyrene.

13. The method as claimed in claim 10, wherein the polyester is built up for more than 70 mol % of units derived from terephthalic acid and butane-1,4-diol.

14. The method as claimed in claim 10, wherein the polyester is a mixture of polybutylene terephthalate and polyethylene terephthalate.

15. The method as claimed in claim 10, wherein the talcum is added to the mixture in the form of a master batch containing styrene acrylate copolymer.

16. The method as claimed in claim 10, wherein the polymer mixture comprises with respect to the sum of the parts by weight of the constituents, about 40 to about 50 by weight of polyester, about 15 to about 25 percent by weight of milled glass fibers, and about 6 to about 15 percent by weight of brominated polystyrene and about 15 to about 25 percent by weight of talcum.

17. The method as claimed in claim 10, further comprising adding to the polyester, milled glass fiber, talcum and brominated polystyrene at least one additive selected from the group consisting of stabilizers, pigments, dyes and a compound to enhance the flame retardancy.

18. A polymer mixture as claimed in claim 1, wherein the milled glass fiber is of the E type.

19. A polymer mixture as claimed in claim 1, wherein the milled glass fiber has an average diameter of about 10 to about 50 micrometers.

* * * * *